United States Patent Office 3,245,922
Patented Apr. 12, 1966

3,245,922
PHOSPHORUS-CONTAINING URETHANE
COMPOSITIONS
Michael Worsley and Blaine O. Schoepfle, Niagara Falls, and Raymond R. Hindersinn, Lewiston, N.Y., assignors to Hooker Chemical Corporation, Niagara Falls, N.Y., a corporation of New York
No Drawing. Filed June 1, 1961, Ser. No. 114,042
20 Claims. (Cl. 260—2.5)

This is a continuation-in-part of our copending application S.N. 15,516, filed March 17, 1960.

This invention relates to novel phosphorus-containing polyurethane compositions and to processes for producing them. In a further aspect, the invention relates to novel phosphorus-containing polyurethane foam products and to processes for producing them.

The compositions of the present invention are useful in the preparation of highly fire-resistant foamed or cellular plastic products. The compositions of the invention are further useful in the preparation of adhesives, binders, laminates, coatings and potting compounds.

The polyurethane foams have found wide and varied use in industry. For instance, they may be used as core materials between skins of many and varied compositions. In aircraft construction, the foam may be enclosed between aluminum or fiber glass reinforced plastic skins to form an assembly which is rigid, strong and yet remarkably light. Because of their excellent electrical properties, polyurethane foams enclosed by fiber glass reinforced plastic skins have also found use in the construction of radomes. The polyurethane foams have another useful property; they develop a high degree of adhesion during the foaming process. As a result they will adhere to skins composed of such varied materials as metals, plastics, ceramics, and glass. The resulting sandwich-type assemblies lend themselves well for use in such diverse fields as in the construction and insulation industries.

The rigid plastic foams can also be utilized without skins as insulating materials for hot water or steam pipes and valves. Their utility for such applications is enhanced by their ability to be applied, foamed, and used in situ.

The rigid plastic foams have many desirable properties. They have great structural strength coupled with low density. In sandwich-type constructions, they exhibit a high degree of rigidity, a property particularly desirable for building purposes. They are excellent vibration dampers and may thus support highly resonant loads. Because of their fine cell structure they are excellent heat and sound insulators. The foam cells may be made very fine and uniform, so that the cells are tough and non-brittle and hence, highly resistant to rupturing.

Many of the polyurethane compositions and foams of the prior art have the disadvantage of being flammable. This disadvantage prevents the use of these materials in many applications. Fire resistance can be imparted to polyurethane compositions by incorporating phosphorus therein. However, it has been found that the manner in which the phosphorus is incorporated is extremely important both with respect to the degree of fire resistance imparted as well as the effects of the phosphorus bearing component on the other properties of the compositions.

Accordingly, it is an object of the invention to provide novel phosphorus-containing compositions that are useful in the production of fire resistant polyurethane compositions.

It is another object of the invention to provide novel fire resistant polyurethane compositions useful in preparing adhesives, foams, laminates, coatings and potting compounds.

Another object is to provide novel polyurethane foams that are strong, fire resistant, and resistant to the deleterious effects of water at elevated temperatures.

Still another object is to provide processes for readily preparing such compositions and products.

These and other objects are accomplished by providing a reaction product of (A) a phosphorus compound having a formula selected from the group consisting of

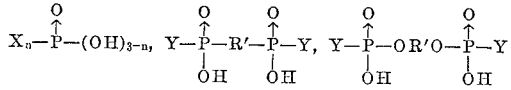

and mixtures thereof, wherein $n$ is a whole number from one to two, X is independently selected from the group consisting of R and RO, and Y is independently selected from the group consisting of R, RO and OH, wherein R is selected from the group consisting of alkyl, cycloalkyl, aralkyl and aryl radicals having one to seven carbon atoms and mixtures thereof, R' is an alkylene group having one to seven carbon atoms; and (B) an epoxide, and (C) an organic polyisocyanate wherein the epoxide and acid groups are reacted in the ratio of substantially one epoxide group per acid group. This composition will hereinafter be designated as the "phosphorus-containing product."

Such phosphorus-containing products can be used in preparing a "pre-polymer" intermediate useful in the preparation of a polyurethane product. The prepolymer is prepared by forming a liquid resinous reaction product of said phosphorus-containing product and an active hydrogen-containing material selected from the group consisting of (1) polycarboxylic compounds having carboxyl numbers from thirty to nine hundred and fifty; (2) polyhydric alcohols having hydroxyl numbers from thirty to nine hundred and fifty; (3) hydroxyl containing polymeric materials having a hydroxyl number between thirty and nine hundred and fifty selected from the group consisting of (a) a polyester comprising the reaction product of a polyhydric alcohol and a polycarboxylic compound, (b) a polyether comprising the reaction product of a monoepoxide and a compound selected from the group consisting of a polyhydric alcohol, a polyphenolic compound, and a polycarboxylic acid, and (c) mixtures thereof; and (4) mixtures thereof. The prepolymer is subsequently reacted with additional hydroxyl containing polymeric material of the character described hereinbefore to produce the final polyurethane composition. The latter step can be accomplished in the presence of a foaming agent to produce a cellular product.

Alternatively, the phosphorus-containing products of this invention are reacted directly with a hydroxyl-containing polymeric material of the character described hereinbefore to produce the final polyurethane composition. The reaction is conducted in the presence of a foaming agent when a cellular product is desired.

It is within the scope of the invention to prepare the phosphorus-containing product in the presence of the active hydrogen-containing material or the hydroxyl-containing polymeric material so that the prepolymers or the polyurethane products can be produced in one step.

It has been found that when a phosphorus ester of the type

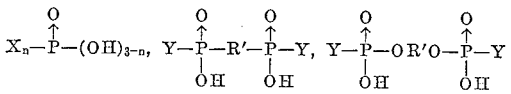

and mixtures thereof as defined hereinbefore, is reacted with an epoxide in the presence of an organic polyisocyanate, a product is produced wherein the epoxide groups have reacted with the acid groups of the phosphorus compound in the ratio of one epoxide group per acid group.

By contrast, when the phosphorus ester is reacted with an epoxide in the absence of an organic polyisocyanate, polyethers form as a result of two or more epoxide groups reacting per acid group. The phosphorus-containing products having one epoxide group per acid group are vastly superior because (1) the excess ether linkages are undesirable since they are easily oxidized to the detriment of the end products, (2) a more rigid foam product can be obtained and (3) more phosphorus per unit weight of material is available for imparting fire resistance to the end products.

In preparing the phosphorus-containing products of this invention, it is preferable to mix the phosphorus compound, the epoxide and the polyisocyanate in a ratio to provide one epoxide group per acid group in the reaction mixture to avoid the production of undesirable by-products. Too great an excess of acid groups with respect to epoxide groups results in side reactions between the acid and isocyanato groups which produce undesirable gaseous by-products. However, the epoxide can be used in an amount sufficient to provide from eighty-five to one hundred and twenty-five percent of epoxide groups with respect to the number of acid groups in the reaction mixture, and in some instances, it may be desirable to use excess epoxide up to two hundred percent of epoxide groups and recover the excess epoxide at the end of the reaction. The polyisocyanate is preferably employed in the reaction mixture in an amount sufficient to provide at least two and up to fifteen isocyanato groups per acid group. One or more of the reactants can be added portionwise to the reaction mixture. Thus, the above ratios refer to those used during the course of the reaction.

The reaction temperature for preparing the phosphorus-containing product can vary within reasonable limits, but will generally range from about twenty to about one hundred and twenty degrees centigrade, preferably from about twenty-five to about eighty degrees centigrade. At elevated temperatures, the undesirable reaction of the acid and isocyanate groups is promoted, while at lower temperatures the reaction rates become slow. Atmospheric pressures are normally employed, although elevated pressures can be employed to facilitate retention of the more volatile epoxides in the reaction mixture.

Typical phosphorus acids that may be employed in the present invention include the following: phosphonic acids,

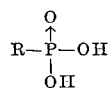

and diphosphonic acids,

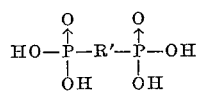

wherein R may be alkyl, cycloalkyl, aryl or aralkyl, and R' is alkyl, for example:

Methylphosphonic acid
Ethylphosphonic acid
Propylphosphonic acid
Butylphosphonic acid
Pentylphosphonic acid
Hexylphosphonic acid
Phenylphosphonic acid
Naphthylphosphonic acid
Tolylphosphonic acid
Xylylphosphonic acid
Benzylphosphonic acid
2-phenylethylphosphonic acid
Cyclohexylphosphonic acid
Methylene diphosphonic acid
Phenylene diphosphonic acid phosphinic acids (secondary phosphonic acids),

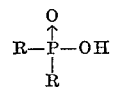

and diphosphinic acids,

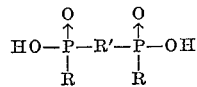

wherein R may be alkyl, cycloalkyl, aryl, aralkyl or mixtures thereof, and R' is alkyl for example:

Dimethylphosphinic acid
Methylethylphosphinic acid
Methylhexylphosphinic acid
Diphenylphosphinic acid
Phenylnaphthylphosphinic acid
Dibenzylphosphinic acid
Methylphenylphosphinic acid
Ethylphenylphosphinic acid
Phenylbenzylphosphinic acid
Cyclohexylphosphinic acid
Methylene dimethyl diphosphinic acid
Phenylene diphenyl diphosphinic acid Typical partially esterified phosphorus acids that may be employed in the present invention include the following:

First degree esters of phosphoric acid (primary phosphates),

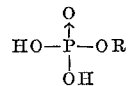

and diphosphoric acids,

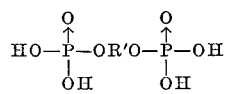

wherein R may be alkyl, cycloalkyl, aryl or aralkyl, and R' is alkyl, for example:

Methylphosphoric acid
Ethylphosphoric acid
Propylphosphoric acid
Butylphosphoric acid
Pentylphosphoric acid
Hexylphosphoric acid
Phenylphosphoric acid
Naphthylphosphoric acid
Cresylphosphoric acid
Benzylphosphoric acid
Cyclohexylphosphoric acid
Neopentyl diphosphoric acid
Ethylene diphosphoric acid The second degree esters of phosphoric acid (secondary phosphates),

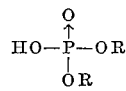

and symmetrical diesters of alkylene diphosphoric acids,

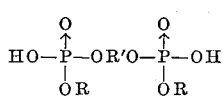

wherein R may be alkyl, cycloalkyl, aryl, aralkyl or mixtures thereof, and R' is alkyl, for example:

Dimethylphosphoric acid
Diethylphosphoric acid
Dibutylphosphoric acid
Methylethylphosphoric acid
Methylpentylphosphoric acid Diphenylphosphoric acid
Phenylnaphthylphosphoric acid
Dibenzylphosphoric acid
Methylphenylphosphoric acid
Phenylbenzylphosphoric acid
Dicyclohexyl phosphoric acid
Diisobutyl neopentyl diphosphoric acid First degree esters of phosphonic acid (primary phosphonates),

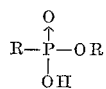

O,O'-alkylene diphosphonic acids,

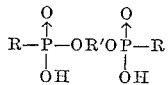

and symmetrical diesters of diphosphonic acids,

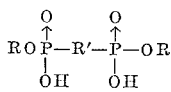

wherein R may be alkyl, cycloalkyl, aryl, aralkyl, or mixtures thereof, and R' is alkyl, for example:

Methyl methylphosphonic acid
Ethyl methylphosphonic acid
Methyl butylphosphonic acid
Phenyl phenylphosphonic acid
Phenyl methylphosphonic acid
Tolyl methylphosphonic acid
Methyl phenylphosphonic acid
Ethyl benzylphosphonic acid
Methyl cyclohexylphosphonic acid
Ethylene dimethyl diphosphonic acid
Dimethyl ethylene diphosphonic acid The compounds containing the OR'O structure are usually prepared by reacting at least 1.5 moles of the appropriate aliphatic glycol with $P_2O_5$. Linear and branched polymeric materials also usually result because of the difunctional nature of the glycol. It is contemplated to use these mixed reaction products in the practice of the invention.

Monomeric and polymeric epoxides can be used in the practice of the invention. Examples of mono-epoxides that may be employed in the practice of the invention are ethylene oxide, propylene oxide, butylene oxide, isobutylene oxide, cyclohexene oxide, 2,3-epoxyhexane, 3-ethyl-2,3-epoxyoctane, epichlorohydrin, epibromohydrin, styrene oxide, glycidol, decylene oxide, triphenyl glycidyl silane, allyl glycidyl ether, methyl glycidyl ether, phenyl glycidyl ether, butyl glycidyl sulfide, glycidyl methyl sulfone, glycidyl methacrylate, glycidyl acrylate, glycidyl benzoate, glycidyl acetate, glycidyl octanoate, glycidyl sorbate, glycidyl allyl phthalate, phenyl-(p-octadecyloxybenzoyl) ethylene oxide,

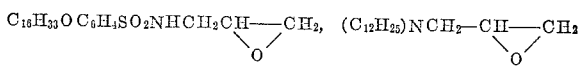

and the like. The preferred monoepoxides are the monoepoxide substituted hydrocarbons, the monoepoxy-substituted ethers, sulfides, sulfones and esters wherein the said compounds contain no more than eighteen carbon atoms. Typical diepoxides are: 3,4-epoxy-6-methylcyclohexylmethyl-3,4-epoxy-6 - methylcyclohexanecarboxylate, dicyclopentadiene dioxide, limonene dioxide, 4,4'-(diglycidyl) diphenylpropane, vinylcyclohexene dioxide. Examples of suitable polyepoxides are: epoxidized vegetable oils, and novolak polyglycidyl ethers.

A large number of various organic polyisocyanates may be used. Of the hydrocarbon polyisocyanates, the arylene and alkarylene polyisocyanates of the benzene and naphthalene series are more reactive and less toxic than the aliphatic members. Consequently, the aromatic compounds are preferred in the present invention. The preferred compounds which are at present most readily available commercially are 2,4-tolylene diisocyanate, 2,6 tolylene diisocyanate and mixtures thereof. However others may be used, among them phenyl isocyanate;
alpha-naphthyl isocyanate;
4-tolylene isocyanate;
n-hexyl isocyanate;
methylene-bis-(4-phenyl isocyanate);
3,3'-bitolylene-4,4'-diisocyanate;
3,3'-dimethoxy-4,4'-biphenylene diisocyanate;
1,5-naphthalene diisocyanate;
2,4-chlorophenyl diisocyanate;
hexamethylene diisocyanate;
ethylene diisocyanate;
trimethylene diisocyanate;
tetramethylene diisocyanate;
pentamethylene diisocyanate;
decamethylene diisocyanate;
1,3-cyclopentylene diisocyanate;
1,2-cyclohexylene diisocyanate;
1,4-cyclohexylene diisocyanate;
cyclopentylidene diisocyanate;
cyclohexylidene diisocyanate;
p-phenylene diisocyanate;
m-phenylene diisocyanate;
4,4'-diphenyl propane diisocyanate;
4,4'-diphenyl methane diisocyanate;
1-methyl-2,4-phenylene diisocyanate;
4,4'-diphenylene diisocyanate;
1,2-propylene diisocyanate;
1,2-butylene diisocyanate;
2,3-butylene diisocyanate;
1,3-butylene diisocyanate;
ethylidene diisocyanate;
propylidene diisocyanate;
butylidene diisocyanate;
1,3,5-benzene triisocyanate;
2,4,6-tolylene triisocyanate;
2,4,6-monochlorobenzene triisocyanate;
4,4',4''-triphenylmethane triisocyanate; and 2,4,4'-diphenyl triisocyanate and mixtures thereof. Higher isocyanates are provided by the liquid reaction products of (1) diisocyanates and (2) polyols or polyamines; etc. In addition, isothiocyanates and mixtures of isocyanates may be employed. Also contemplated are the many impure or crude polyisocyanates that are commercially available.

The hydroxyl containing polymeric materials that can be used with the phosphorus-containing products are polyesters, polyethers, and mixtures thereof. The polyesters employed are known in the art and are the reaction products of a polyhydric alcohol and a polycarboxylic compound. Whenever used in this application, the term polycarboxylic compound is intended to include the acids, the acid anhydrides, the acid halides or the acid esters or mixtures thereof.

It is generally desirable, especially in rigid or semi-rigid foams, that at least a portion of the total polyhydric alcohol component consist of three hydroxyl groups in order to provide a means for branching the alkyd; however, the ratio of dihydric alcohol to trihydric alcohol may be varied depending on the amount of branching desired. The polyhydric alcohols may be aliphatic, cycloaliphatic, heterocyclic or aromatic and may be saturated or unsaturated. The alcohol may contain one or more dissimilar atoms between carbon atoms in their molecule, such as oxygen, sulfur, and the like. They may also be substituted with non-interfering substituents, such as halogen ms, ester radicals, and the like. Illustrative polyhydric alcohols include the following:

cerol;
lyglycerol;
ntaerythritol;
lypentaerythritol;
nnitol, trimethylolpropane;
bitol;
thyltrimethylolmethane;
,6-octanetriol;
tanediol;
ntanediol;
xanediol;
decanediol;
tanediol;
loropentanediol;
cerol mono-allyl ether;
cerol monoethyl ether;
ethylene glycol;
ethylhexanediol-1,4;
3'-thiodipropanol;
4'-sulfonyldihexanol;
clohexanediol-1,4;
2,6-hexanetriol;
3,5-hexanetriol;
lyallyl alcohol;
3-bis(2-hydroxyethoxy)propane;
5'-dihydroxydiamyl ether;
trahydrofuran-2,5-dipropanol;
trahydrofuran-2,5-dipentanol;
5-dihydroxytetrahydrofuran;
trahydrothiophene-2,5-dipropanol;
trahydropyrrole-2,5-propanol;
hydroxy-3-hydroxytetrahydropyran;
5-dihydroxy-3,4-dihydro-1,2-pyran;
4'-sulfinyldipropanol;
2-bis(4-hydroxyphenyl)-propane;
2'-bis(4-hydroxyphenyl)-methane; and e like. Preferred polyols are the open-chain aliphatic lyhydric alcohols and polyalkylene ether polyols possing from two to six esterifiable hydroxyl groups and ntaining no more than twenty carbon atoms.

The polycarboxylic compounds useful in the practice f the invention may be aliphatic, cycloaliphatic, aromat- or heterocyclic and may be saturated or unsaturated. lustrative polycarboxylic compounds include the following:

hthalic acid, isophthalic acid;
rephthalic acid;
trachlorophthalic acid;
aleic acid; dodecylmaleic acid;
ctadecenylmaleic acid;
umaric acid;
conitic acid, itaconic acid;
rimellitic acid;
ricarballylic acid;
,3'-thiodipropionic acid;
,4'-sulfonyldihexanoic acid;
-octenedioic-1,7 acid;
-methyl-3-decenedioic acid;
uccinic acid;
dipic acid;
1,4-cyclohexadiene-1,2-dicarboxylic acid;
3-methyl-3,5-cyclohexadiene-1,2-dicarboxylic acid;
3-chloro-3,5-cyclohexadiene-1,2-dicarboxylic acid;
3,12-eicosadienedioic acid;
3-vinyl-10-octadecenedioic acid; and the corresponding acid anhydrides, acid chlorides and acid sters, such as phthalic anhydride, phthaloyl chloride, and the dimethyl ester of phthalic acid. Preferred polycarboxylic compounds are the aliphatic and cycloaliphatic dicarboxylic acids containing no more than fourteen carbon atoms and the aromatic dicarboxylic acid containing no more than fourteen carbon atoms.

Part or all of either the polyhydric alcohol or the polycarboxylic portion may consist of an adduct of hexahalocyclopentadiene, wherein the halogen is selected from the group consisting of chlorine, bromine, fluorine and mixtures thereof. Among the adducts of hexahalocyclopentadiene and polycarboxylic compounds which may be used are:

1,4,5,6,7,7-hexachlorobicyclo-(2.2.1)-5-heptene-2,3-dicarboxylic acid;
1,4,5,6,7,7-hexachlorobicyclo-(2.2.1)-5-heptene-2,3-dicarboxylic anhydride;
1,4,5,6,7,7-hexachloro-2-methylbicyclo-(2.2.1)-5-heptene-2,3-dicarboxylic anhydride;

the mono- or di-methyl ester of 1,4,5,6,7,7-hexachlorobicyclo-(2.2.1)-5-heptene-2,3-dicarboxylic acid;
1,4,5,6-tetrachloro-7,7-difluorobicyclo-(2.2.1)-5-heptene-2,3-dicarboxylic acid;
1,4,5,6,7,7-hexachlorobicyclo-(2.2.1)-5-heptene-2-acetic-2-carboxylic anhydride; and
1,4,5,6,7,7-hexachlorobicyclo-(2.2.1)-5-heptene-2,3-dicarbonyl chloride which is the adduct of hexachlorocyclopentadiene with fumaryl chloride.

Among the adducts of hexahalocyclopentadiene and polyhydric alcohols which may be used are:

1,4,5,6,7,7-hexachloro-2,3-bis-hydroxymethylbicyclo-(2.2.1)-5-heptene;
1,4,5,6,7,7-hexachloro-2,3-bis-hydroxymethylbicyclo-(2.2.1)-2,5-heptadiene;
3-(1,4,5,6,7,7-hexachlorobicyclo-(2.2.1)-5-heptene-2-yl)-methoxy-1,2-propanediol;
1,4,5,6-tetrachloro-7,7-difluoro-2,3-bis-hydroxymethylbicyclo-(2.2.1)-5-heptene;
1,4,5,6,7,7-hexabromo-2,3-bis-hydroxymethylbicyclo-(2.2.1)-5-heptene;
3-(1,4,5,6-tetrachloro-7,7-difluorobicyclo-(2.2.1)-5-heptene-2-yl)-methoxy-1,2-propane diol.

These compounds and the method of preparation are disclosed in copending application SN 308,922 for "Poly-Halogen-Containing Polyhydric Compounds," filed September 10, 1952, now U.S. Patent No. 3,007,958.

The polyethers are the reaction products of a polyhydric alcohol, a polyphenolic compound or a polycarboxylic acid and a monomeric epoxide possessing a single epoxy group, such as, for example, propylene oxide. The polyhydric alcohols, polycarboxylic acids and epoxides which can be employed are any of the polyhydric alcohols, polycarboxylic acids and monoepoxides hereinbefore listed. The preferred monoepoxides are the monoepoxide substituted hydrocarbons, the monoepoxy-substituted ethers, sulfides, sulfones and esters wherein the said compounds contain no more than eighteen carbon atoms. Polyphenolic compounds which can be employed are the reaction products of phenolic compounds with aldehydes, such as phenol-formaldehyde resins.

Where aromatic or bicyclo carboxylic compounds are used, it is often desirable to incorporate aliphatic acids as part of the resin. Adipic acid is generally preferred for this purpose, although other suitable acids may be used such as oxalic, malonic, succinic, glutaric, pimelic, suberic, azelaic, etc. Unsaturated acids such as maleic, fumaric, itaconic, citraconic, aconitic, etc., may also be used.

The active hydrogen-containing materials such as polycarboxylic compounds, polyhydric alcohols, hydroxyl-containing polymeric materials, and mixtures thereof which can be employed in preparing the novel prepolymers of the invention are any of the polycarboxylic compounds, polyhydric alcohols and hydroxyl-containing polymeric materials described herein. By active hydrogen-containing material is meant one containing an "active hydrogen atom," which refers to hydrogens which display activity according to the well known Zerewitinoff method as described by Kohler in J.A.C.S., 49, 3181 (1927). In the preparation of these prepolymers, the phosphorus-containing product is reacted with the active hydrogen-containing material in an amount to provide at least about two hundred percent of reactive isocyanato groups with respect to the total number of hydroxyl and carboxyl groups in the active hydrogen-containing material. By "reactive" groups is meant those isocyanato groups that are not reacted in the formation of the phosphorus-containing product. The upper limit on the ratio of isocyanato groups to hydroxyl and carboxyl groups is governed by the results desired, but would not generally exceed about fifteen hundred percent. The temperature for preparing the prepolymers can vary considerably, but generally falls in the range from about twenty to about one hundred and twenty degrees centigrade. Alternatively, the prepolymers can be prepared by forming the phosphorus-containing product in the presence of the active hydrogen-containing material. Thus, a mixture of an epoxide and a polyisocyanate can be mixed with a mixture of the phosphorus compound and the active hydrogen-containing material to produce the prepolymer in one step.

The polyurethane end products of the invention (foams, coatings, adhesives and the like), are prepared by any one of three methods: (1) the phosphorus-containing product can be prepared in the presence of a hydroxyl-containing polymeric material to produce the polyurethane product in one step, (2) the phosphorus-containing product can be reacted with a hydroxyl-containing polymeric material or (3) a prepolymer containing the phosphorus-containing product can be reacted with a hydroxyl containing polymeric material. In any case, the components are preferably reacted in a ratio sufficient to provide about eighty-five to one hundred and fifteen percent of reactive isocyanato groups with respect to the total number of hydroxyl and carboxyl groups present in the hydroxyl-containing polymeric material (and the foaming agent, if one is provided). "Reactive" groups are those isocyanato groups that are not reacted in the formation of the phosphorus-containing product. The reaction temperature generally ranges from twenty to one hundred and twenty degrees centigrade, although higher and lower temperatures can be used.

Reaction catalysts can be used in producing the polyurethane compositions. The catalyst employed may be any of the known conventional catalysts for isocyanate reactions, such as tertiary amines, for example, triethylamine, N-methyl morpholine, triethanolamine, etc., or antimony compounds such as disclosed and claimed in SN 803,820, filed April 3, 1959, for example, antimony caprylate, antimony naphthenate, or antimonous chloride. In addition, tin compounds may be employed such as disclosed and claimed in SN 803,819 filed April 3, 1959, now abandoned, for example, dibutyltin dilaurate, tri-n-octyltin oxide, hexabutylditin, tributyltin phosphate or stannic chloride. Rigid or flexible polyurethane foams are thereby obtained. The rigid polyurethane foams utilize a highly branched hydroxyl rich polyester or polyether having a hydroxyl number of between about two hundred and nine hundred and fifty. The flexible polyurethane foams utilize a linear relatively hydroxyl poor polyester or polyether having a hydroxyl number of between about thirty and one hundred. If a polyester or polyether with a hydroxyl number between about one hundred and two hundred is employed, a semi-rigid polyurethane foam is usually obtained.

When the polyurethane compositions of the invention are foamed, any foaming agent commonly used in the polyurethane art may be employed. Foaming agents in this art are generally those materials that are capable of liberating gaseous products when heated, or when reacted with an isocyanate. Preferably foaming is accomplished by introducing a low boiling liquid into the catalyzed resin. The heat of reaction is then sufficient to expand the mixture to a foam stable enough to retain its shape until the resin gels. Suitable liquids are the fluorochlorocarbons boiling in the range of twenty to fifty degrees centigrade, and mixtures thereof, for example, trichlorofluoromethane, trichlorotrifluoroethane, dichloromonofluoromethane, monochloroethane, monochloromonofluoroethane, difluoromonochloroethane, and difluorodichloroethane.

Another foaming system that is suitable for carrying out the foaming reaction at an elevated temperature is found in United States Patent 2,865,869, which discloses and claims the use of tertiary alcohols in the presence of strong, concentrated acid catalysts. Examples of tertiary alcohols include: tertiary amyl alcohol; tertiary butyl alcohol; 2-methyl-3-butyn-2-ol; 1-methyl-1-phenylethanol; and 1,1,2,2-tetraphenylethanol, etc. Examples of catalysts include: sulfuric acid; phosphoric acid; sulfonic acid; and aluminum chloride; etc. In addition, various secondary alcohols and glycols may be used as: 1-phenyl-1,2-ethanediol; 2-butanol; etc. Generally, secondary alcohols should be used with strong concentrated acid catalysts as above; however, certain secondary alcohols may be used without the acid catalyst, e.g., acetaldol, chloral hydrate, etc. Other foaming agents that may be used include the following: polycarboxylic acids, polycarboxylic acid anhydrides, dimethylol ureas, polymethylol phenols, formic acid and tetrahydroxy methylphosphonium chloride. In addition, mixtures of the above foaming agents may be employed.

The following resin formulations are typical hydroxyl-containing polymeric materials that may be used in the practice of this invention.

RESIN A 6 moles 1,4,5,6,7,7-hexachlorobicyclo-(2.2.1)-5-heptene-2,3-dicarboxylic acid
12 moles trimethylolpropane
Acid number: less than 10
Hydroxyl number: 365.

RESIN B 6 moles adipic acid
10 moles trimethylolpropane
Acid number: less than 1
Hydroxyl number: 504.

RESIN C 5 moles phenol
4 moles formaldehyde
1.25 moles ethylene oxide per phenolic hydroxide group
Hydroxyl number: 325.

RESIN D 3 moles phenol
2 moles formaldehyde
2.5 moles ethylene oxide per phenolic hydroxide group
Hydroxyl number: 270.

RESIN E

Polypropylene glycol
Molecular weight: about 2000
Hydroxyl number: 56.

RESIN F 4 moles 1,4,5,6,7,7-hexachlorobicyclo-(2.2.1)-5-heptene-2,3-dicarboxylic acid
7.6 moles glycerol
2 moles adipic acid
Acid number: 5
Hydroxyl number: 265.

RESIN G moles adipic acid
moles glycerol
cid number: 1
ydroxyl number: 640.

RESIN H mole trimethylolpropane
moles propylene oxide
ydroxyl number: 392.

RESIN I 8 moles trimethylolpropane
moles adipic acid
mole phthalic anhydride
cid number: less than 1
[ydroxyl number: 435.

RESIN J mole 1,4,5,6,7,7-hexachlorobicyclo-(2.2.1)-5-heptene-2,3-dicarboxylic acid
moles propylene oxide
Acid number: 0
Hydroxyl number: 202.

The following example describes the preparation of a novel phosphorus-containing urethane composition of the invention.

Example 1

To six hundred and ninety grams of a commercial mixture of eighty percent 2,4-tolylene diisocyanate and twenty percent 2,6-tolylene diisocyanate is added one hundred and seventy grams of 3,4-epoxy-6-methylcyclohexylmethyl-3,4-epoxy-6-methylcyclohexane carboxylate, a diepoxide having the structural formula:

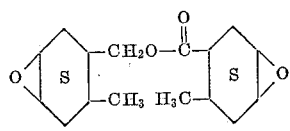

at ambient temperature. To this mixture is added dropwise and with vigorous stirring one hundred and forty grams of a commercial mixture comprising approximately fifty mole percent butyl monoacid phosphate and fifty mole percent butyl diacid phosphate. The temperature is maintained below forty degrees centigrade with a cold water bath. One-half hour after the addition of the acid phosphates, the temperature is raised to eighty degrees centigrade for one-half hour.

During the preparation, all gaseous products of the reaction are passed through a tube of ascarite mounted on the reaction vessel. At the end of the reaction, the ascarite tube has gained in weight by only 0.0322 gram, indicating that a trace amount of carbon dioxide has been produced. This test indicates that the epoxide and acid groups have reacted in a one to one ratio. If more than one epoxide group reacts per acid group, the remaining free acid groups react with isocyanate groups to produce carbon dioxide.

In the following examples, additional phosphorus-containing products of the invention are produced by reacting the indicated components in accordance with the procedure of Example 1.

| Ex. | Phosphorus Compound | Epoxide | Isocyanate |
|---|---|---|---|
| 2 | Butylphosphonic acid | Propylene oxide | Tolylene diisocyanate. |
| 3 | Benzene phosphonic acid | do | Do. |
| 4 | Dimethylphosphinic acid | do | Do. |
| 5 | Methyl monoacid phosphate | do | Do. |
| 6 | Methyl cyclohexylphosphonic acid | do | Do. |
| 7 | Mixture of butyl monoacid and diacid phosphates | do | Do. |
| 8 | Mixture of amyl monoacid and diacid phosphates | do | Do. |
| 9 | Mixture of butyl monoacid and diacid phosphates | do | 50% Methylene-bis-(4-phenyl isocyanate) and 50% tolylene diisocyanate. |
| 10 | do | Cyclohexene oxide | Tolylene diisocyanate. |
| 11 | do | Glycidol | Do. |
| 12 | do | Epoxidized vegetable oil | Do. |
| 13 | Mixture of neopentyl diphosphoric acid and butyl acid phosphate | Propylene oxide | Do. |
| 14 | Methylene diphosphonic acid | do | Do. |
| 15 | do | do | Do. |

The following examples disclose the preparation of prepolymers in accordance with the present invention.

Example 16

Three hundred and forty-nine grams of the commercial mixture of tolylene diisocyanate used in Example 1, and thirty-six grams of propylene oxide are charged into a flask. To this mixture, a blend of 43.5 grams of a mixture of methyl monoacid phosphate and methyl diacid phosphate and 56.5 grams of Resin A is added drop-wise with rapid stirring over the temperature range of forty to fifty-five degrees centigrade. The components pass into solution immediately and the reaction is exothermic.

Example 17

The components employed in Example 16 are used in the same proportions. However, the procedure is modified so that the methyl acid phosphate alone is added drop-wise to the mixture of tolylene diisocyanate and propylene oxide at a temperaure of about fifty degrees centigrade. During the reaction substantially no carbon dioxide is evolved. A the completion of the reaction, the resulting urethane composition is mixed with Resin A to produce a prepolymer composition.

In the following examples, additional prepolymers of this invention are produced by reacting the indicated components in accordance with the procedure of Example 17.

| Example | 18 | 19 |
|---|---|---|
| Phosphorus Compound | Mixture of butyl monoacid and diacid phosphates. | Mixture of butyl monoacid and diacid phosphates. |
| Epoxide | Propylene oxide | Propylene oxide. |
| Isocyanate | Tolylene diisocyanate | Tolylene diisocyanate. |
| Active hydrogen-containing material | 1,4,5,6,7,7-hexachlorobicyclo-(2.2.1)-5-heptene-2,3-dicarboxylic acid. | 5,6-Bis(hydroxymethyl)-1,2,3,4,7,7-hexachlorobicyclo-(2.2.1)-heptene-2. |

The following examples exemplify the preparation of the polyurethane compositions of the invention wherein a liquid prepolymer containing the phosphorus-containing product is reacted with hydroxyl-containing polymeric material.

Example 20

Fifty grams of Resin A and fifty grams of Resin D are mixed with 0.5 gram of an emulsifier that is a silicone-glycol copolymer, designated QF–1–0113 by the manufacturer, Dow Corning Corporation, and one gram N,N, N',N'-tetramethylbutane diamine-1,3. To this solution is added one hundred and five grams of the prepolymer prepared in Example 16 with rapid stirring. When applied to the surface of a sheet of steel, this polyurethane composition forms a durable coating that is highly flame-resistant, and water-resistant.

Example 21

A polyurethane foam is produced by repeating Example 20, except that the prepolymer contains thirty grams of trichlorofluoromethane. Thirty seconds after the components are blended, the liquid blend is poured into a mold and permitted to expand at about thirty degrees centigrade. The foam rose rapidly and was cured at eighty degrees centigrade, for ten minutes. The finished foam product has a fine cell structure, a density of 2.2 pounds per cubic foot and is highly fire retardant.

The following examples describe the preparation of the polyurethane compositions of the invention by the method wherein the phosphorus-containing product is reacted with a hydroxyl-containing polymeric material.

Example 22

One hundred grams of Resin B is mixed with 0.5 gram of a silicone emulsifier designated QF–1–0113 and 0.8 gram N,N,N',N'-tetramethylbutanediamine-1,3. To this mixture is added with rapid stirring one hundred and forty grams of the urethane composition of Example 1. A sample of the resulting polyurethane composition is placed between two aluminum plates. The assembly is held together with a C-clamp for two hours at about thirty degrees centigrade. The resulting bond has good strength, indicating the polyurethane composition to have good adherence to the metal surfaces.

Example 23

To a mixture of one hundred grams of Resin B, 0.5 gram of a silicone emulsifier designated QF–1–0113 and 0.8 gram N,N,N',N'-tetramethylbutanediamine-1,3 is added with rapid stirring a solution of one hundred and forty grams of the urethane composition of Example 1 and thirty-five grams trichlorofluoromethane. Foaming of the composition begins in thirty seconds. The resulting from foam is cured for two hours at about thirty degrees centigrade to produce a fire-retardant foam product having a fine cell structure and a density of 2.75 pounds per cubic foot.

The following examples describe the preparation of the polyurethane compositions in accordance with the invention wherein the phosphorus-containing product is prepared in the presence of a hydroxyl-containing polymeric material to produce the polyurethane product in one step.

Example 24

To 77.5 grams of Resin A is added 7.5 grams trimethylolpropane and fifteen grams of a commercial mixture comprising about fifty mole percent butyl monoacid phosphate and about fifty mole percent butyl diacid phosphate at a temperature of about ninety degrees centigrade. The mixture is cooled to forty degrees centigrade. To the cooled mixture is added with rapid stirring a solution of ninety-three grams of a crude commercial mixture of 2,4-tolylene diisocyanate and 2,6-tolylene diisocyanate, designated Nacconate 4040 by the manufacturer Allied Chemical Corporation, eighteen grams of 3,4-epoxy-6-methylcyclohexylmethyl - 3,4 - epoxy - 6-methylcyclohexane carboxylate and 0.5 gram of the silicone emulsifier designated QF–1–0113. The resulting polyurethane composition is spread upon an aluminum plate and found to provide a durable, fire-resistant and water-resistant coating.

Another sample of the composition is formed into a casting and exposed to boiling water for one month. The pH of the aqueous medium at the end of the period of exposure is six and the casting remained hard at one hundred degrees centigrade. These properties indicate the composition is substantially acid-free and has excellent hydrolytic stability.

Example 25

The experiment of Example 24 is repeated except that the isocyanate-diepoxide mixture also contains twenty-five grams of trichlorofluoromethane. Twenty seconds after mixing the components, the resulting composition is poured into a mold and permitted to rise at about thirty degrees centigrade. After gelation, the foam is cured at one hundred degrees centigrade for ten minutes, has a fine cell structure, a density of 2.5 pounds per cubic foot, and is highly fire retardant, as evidenced by the fact that it has a burning rate of only 0.3 inch per minute.

Example 26

To a mixture of eighty-five grams of Resin C and fifteen grams of a commercial mixture comprising about fifty mole percent butyl monoacid phosphate and about fifty mole percent butyl diacid phosphate is added a solution of seventy grams of a crude commercial mixture of 2,4-tolylene diisocyanate and 2,6-tolylene diisocyanate, eighteen grams of 3,4-epoxy-6-methylcyclohexylmethyl-3,4-epoxy-6-methylcyclohexane carboxylate, 0.5 gram of silicone emulsifier QF–1–0113. The resulting polyurethane composition was coated on aluminum plates to produce a durable, fire-retardant, water-resistant coating.

Example 27

The experiment of Example 26 was repeated except that the isocyanate-diepoxide mixture also contained twenty-five grams trichlorofluoromethane. Twenty seconds after mixing the components, the polyurethane composition was poured into a mold and permitted to expand at about thirty degrees centigrade. After gelation occurred, the foam was cured for ten minutes at eighty degrees centigrade. The final product was a tough, fire-retardant foam having a density of 2.5 pounds per cubic foot and a fine cell structure.

Example 28

The following components were blended at seventy degrees centigrade: 77.5 grams of Resin A, 7.5 grams trimethylolpropane, 15.0 grams of a commercial mixture comprising about fifty mole percent butyl monoacid phosphate and about fifty mole percent butyl diacid phosphate, and one gram of water. To this blend at forty degrees centigrade is added with rapid stirring a solution of one hundred and five grams of a crude commercial mixture of 2,4-tolylene diisocyanate and 2,6-tolylene diisocyanate, nineteen grams of 3,4-epoxy-6-methylcyclohexylmethyl-3,4-epoxy-6-methylcyclohexane carboxylate, 0.5 gram of silicone emulsifier QF–1–0113, and fifteen grams of trichlorofluoromethane. Twenty seconds after mixing the components, the composition is poured into a mold and permitted to expand at about thirty degrees centigrade. After gelation occurs, the foam is cured at one hundred degrees centigrade for ten minutes. The final product is a fine-celled, fire-retardant, rigid foam having a density of 2.05 pounds per cubic foot. This foam can be cycled to a temperature of one hundred and thirty degrees centigrade without expansion.

Example 29

Twenty-five parts of Resin A and twenty-five parts of Resin C are blended with nine parts of a commercial mixture comprising about fifty mole percent butyl monoacidphosphate and about fifty mole percent butyl diacid osphate. To one hundred grams of this blend is added a solution of one hundred grams of a commercial polyisocyanate formed from aniline formaldehyde polymers and designated by the tradename "PAPI" by the manufacturer, Carwin Chemical Company, nineteen grams of 3,4-epoxy - 6 - methylcyclohexylmethyl - 3,4 - epoxy - 6-methylcyclohexane carboxylate, 0.5 gram of the silicone emulsifier QF-1-0113, and thirty grams trichlorofluoroethane with rapid stirring. Twenty seconds after the components are mixed, the composition is poured into a mold and permitted to expand at about thirty degrees centigrade. After gelation occurs, the foam is cured at one hundred degrees centigrade for ten minutes. The final product is a fine-celled, fire-retardant foam having a density of 2.4 pounds per cubic foot.

While our invention has been described with reference to certain specific embodiments, it will be recognized by those skilled in the art that many variations are possible without parting from the spirit and scope of the invention. Having thus described our invention, we claim:

1. The process which comprises reacting a mixture comprised of (A) a phosphorous compound having the formula

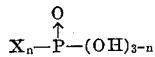

and mixtures thereof, wherein *n* is a whole number from one to two, X is independently selected from the group consisting of R and RO, wherein R is selected from the group consisting of alkyl and aryl radicals having one to seven carbon atoms; (B) an epoxide having one to two epoxide groups and up to 18 carbon atoms, and (C) an organic polyisocyanate; in which process the proportions of components are sufficient to provide from eighty-five to two hundred percent of epoxide groups with respect to the number of acid groups, and at least two isocyanato groups per acid group.

2. The process of claim 1 wherein the reaction mixture also comprises an active-hydrogen-containing material selected from the group consisting of (1) polycarboxylic compounds having carboxyl numbers from thirty to nine hundred and fifty; (2) polyhydric alcohols having hydroxyl numbers from thirty to nine hundred and fifty; (3) hydroxyl containing polymeric materials having a hydroxyl number between thirty and nine hundred and fifty and selected from the group consisting of (a) a polyester comprising the reaction product of a polyhydric alcohol and a polycarboxylic compound, (b) a polyether comprising the reaction product of a monoepoxide and a compound selected from the group consisting of a polyhydric alcohol, a polyphenolic compound and a polycarboxylic acid, and (c) mixtures thereof; and (4) mixtures thereof, in an amount sufficient to provide at least about two hundred percent of reactive isocyanato groups with respect to the total number of hydroxyl and carboxyl groups in the active hydrogen containing material.

3. The process of claim 1 wherein the reaction mixture also comprises a hydroxyl containing polymeric material having a hydroxyl number between thirty and nine hundred and fifty and selected from the group consisting of (a) a polyester comprising the reaction product of a polyhydric alcohol and a polycarboxylic compound, (b) a polyether comprising the reaction product of a monoepoxide and a compound selected from the group consisting of a polyhydric alcohol, a polyphenolic compound and a polycarboxylic acid, and (c) mixtures thereof, in an amount sufficient to provide about eighty-five to one hundred and fifteen percent of reactive isocyanato groups with respect to the total number of hydroxyl and carboxyl groups present in the hydroxyl-containing polymeric material.

4. The process for producing a fire resistant, cellular reaction product which comprises reacting a phosphorus-containing product with a hydroxyl containing polymeric material having a hydroxyl number between thirty and nine hundred and fifty and selected from the group consisting of (a) a polyester comprising the reaction product of a polyhydric alcohol and a polycarboxylic compound, (b) a polyether comprising the reaction of a monoepoxide and a compound selected from the group consisting of a polyhydric alcohol, a polyphenolic compound and a polycarboxylic acid, and (c) mixtures thereof, in the presence of a foaming agent; said phosphorus-containing product being prepared in accordance with the process of claim 1; and said phosphorus-containing product being present in an amount sufficient to provide eighty-five to one hundred and fifteen percent of reactive isocyanato groups with respect to the total number of hydroxyl and carboxyl groups present in the hydroxyl-containing polymeric material and the foaming agent.

5. The process for producing a fire resistant, cellular reaction product which comprises reacting a resinous reaction product with a hydroxyl-containing polymeric material having a hydroxyl number between thirty and nine hundred and fifty and selected from the group consisting of (a) a polyester comprising the reaction product of a polyhydric alcohol and a polycarboxylic compound, (b) a polyether comprising the reaction product of a monoepoxide and a compound selected from the group consisting of a polyhydric alcohol, a polyphenolic compound and a polycarboxylic acid, and (c) mixtures thereof, in the presence of a foaming agent; said resinous reaction product being prepared in accordance with the process of claim 2; and said resinous reaction product being present in an amount sufficient to provide eighty-five to one hundred and fifteen percent of reactive isocyanato groups with respect to the total number of hydroxyl and carboxyl groups present in the active hydrogen-containing components and foaming agent used in the process.

6. The process which comprises reacting a mixture comprised of an alkyl monoacid phosphate and an alkyl diacid phosphate wherein the alkyl radicals have one to seven carbon atoms, an organic polyisocyanate, and a monoepoxide having up to 18 carbon atoms; in which process the proportions of components are sufficient to provide eighty-five to two hundred percent of epoxide groups with respect to the number of acid groups, and at least two isocyanato groups per acid group, and where in the reaction temperature is in the range from about 20 to about 120 degrees centigrade.

7. The process which comprises reacting a mixture comprised of (A) a mixture of butyl monoacid phosphate and butyl diacid phosphate, (B) propylene oxide, and (C) an organic polyisocyanate; in which mixture the components are present in amounts sufficient to provide from 85 to 200 percent of epoxide groups with respect to the number of acid groups, and at least two isocyanato groups per acid group, and wherein the reaction temperature is in the range from about 20 to about 120 degrees centigrade.

8. The process which comprises reacting a mixture comprised of (A) a mixture of butyl monoacid phosphate and butyl diacid phosphate, (B) 3,4-epoxy-6-methylcyclohexylmethyl - 3,4 - epoxy-6-methylcyclohexane carboxylate, and (C) an organic polyisocyanate; in which mixture the components are present in amounts sufficient to provide from 85 to 200 percent of epoxide groups with respect to the number of acid groups, and at least two isocyanato groups per acid group; and wherein the reaction temperature is in the range from about 20 to about 120 degrees centigrade.

9. The phosphorus-containing reaction product of a mixture comprising (A) a phosphorus compound having the formula

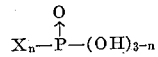

and mixtures thereof, wherein *n* is a whole number from one to two, X is independently selected from the group consisting of R and RO, wherein R is selected from the group consisting of alkyl and aryl radicals having one to seven carbon atoms; (B) an epoxide having one to two epoxide groups and up to 18 carbon atoms, and (C) an organic polyisocyanate, said product having at least two isocyanato groups per acid group and wherein the epoxide and acid groups are reacted in the ratio of substantially one epoxide group per acid group.

10. The phosphorus-containing reaction product of a mixture of an alkyl monoacid phosphate and an alkyl diacid phosphate wherein the alkyl radicals have one to seven carbon atoms, an organic polyisocyanate, and a monoepoxide having up to 18 carbon atoms, having at least two isocyanato groups per acid group, and wherein the epoxide and acid groups are reacted in the ratio of substantially one epoxide group per acid group.

11. The product of claim 10 wherein the mixture of alkyl phosphates is a mixture of methyl monoacid phosphate and methyl diacid phosphate.

12. The product of claim 10 wherein the mixture of alkyl phosphates is a mixture of butyl monoacid phosphate and butyl diacid phosphate.

13. The phosphorus-containing reaction product of a mixture of butyl mono acid phosphate and butyl diacid phosphate, tolylene diisocyanate, and propylene oxide, having at least two isocyanato groups per acid group, and wherein the epoxide and acid groups are reacted in the ratio of substantially one epoxide group per acid group.

14. The phosphorus-containing reaction product of a mixture of butyl monoacid phosphate and butyl diacid phosphate, tolylene diisocyanate, and 3,4-epoxy-6-methylcyclohexylmethyl-3,4-epoxy-6-methylcyclohexane carboxylate, having at least two isocyanato groups per acid group, and wherein the epoxide and acid groups are reacted in the ratio of substantially one epoxide group per acid group.

15. The polyurethane product of the phosphorus-containing product of claim 9 and at least one active hydrogen-containing material selected from the group consisting of (1) polycarboxylic compounds having carboxyl numbers from thirty to nine hundred and fifty; (2) polyhydric alcohols having hydroxyl numbers from thirty to nine hundred and fifty; (3) hydroxyl containing polymeric materials having a hydroxyl number between thirty and nine hundred and fifty and selected from the group consisting of (a) a polyester comprising the reaction product of a polyhydric alcohol and a polycarboxylic compound, (b) a polyether comprising the reaction product of a monoepoxide and a compound selected from the group consisting of a polyhydric alcohol, a polyphenolic compound and a polycarboxylic acid, and (c) mixtures thereof; and (4) mixtures thereof; wherein said phosphorus-containing product is present in an amount sufficient to provide at least about eighty-five percent of reactive isocyanato groups with respect to the total number of hydroxyl and carboxyl groups in the active hydrogen-containing material.

16. The polyurethane product of the phosphorus-containing product of claim 10 and a hydroxyl-containing polymeric material having a hydroxyl number between thirty and nine hundred and fifty and selected from the group consisting of (a) a polyester comprising the reaction product of polyhydric alcohol and polycarboxylic compound; (b) a polyether comprising the reaction product of a monoepoxide and a compound selected from the group consisting of a polyhydric alcohol, a polyphenolic compound and a polycarboxylic acid, and (c) mixtures thereof; wherein said phosphorus-containing product is present in an amount sufficient to provide at least about eighty-five percent of reactive isocyanato groups with respect to the total number of hydroxyl and carboxyl groups in the hydroxyl-containing polymeric material.

17. The fire resistant cellular reaction product comprising the phosphorus-containing product of claim 9, a hydroxyl containing polymeric material having a hydroxyl number between thirty and nine hundred and fifty selected from the group consisting of (a) a polyester comprising the reaction product of a polyhydric alcohol and a polycarboxylic compound, (b) a polyether comprising the reaction product of a monoepoxide and a compound selected from the group consisting of a polyhydric alcohol, a polyphenolic compound and a polycarboxylic acid, and (c) mixtures thereof; and a foaming agent; said phosphorus-containing product being present in an amount sufficient to provide eighty-five to one hundred and fifteen percent of reactive isocyanato groups with respect to the total number of hydroxyl and carboxyl groups present in the hydroxyl-containing polymeric material and the foaming agent.

18. The fire resistant cellular reaction product comprising the phosphorus-containing product of claim 10, a hydroxyl-containing polymeric material having a hydroxyl number between thirty and nine hundred and fifty selected from the group consisting of (a) a polyester comprising the reaction product of a polyhydric alcohol and a polycarboxylic compound, (b) a polyether comprising the reaction product of a monoepoxide and a compound selected from the group consisting of a polyhydric alcohol, a polyphenolic compound and a polycarboxylic acid, and (c) mixtures thereof; and a foaming agent; said phosphorus-containing product being present in an amount sufficient to provide eighty-five to one hundred and fifteen percent of reactive isocyanato groups with respect to the total number of hydroxyl and carboxyl groups present in the hydroxyl-containing polymeric material and the foaming agent.

19. The cellular reaction product of claim 18 wherein the hydroxyl-containing polymeric material comprises a reaction product of a polyhydric alcohol and 1,4,5,6,7,7-hexachlorobicyclo - (2.2.1) - 5 - heptene-2,3-dicarboxylic acid.

20. The cellular reaction product of claim 18 wherein the hydroxyl-containing polymeric material comprises a reaction product of a monoepoxide and a phenol-formaldehyde resin compound.

References Cited by the Examiner

UNITED STATES PATENTS

| 2,929,800 | 3/1960 | Hill | 260—2.5 |
| 3,058,925 | 10/1962 | Robitschek | 260—2.5 |

FOREIGN PATENTS

| 1,106,489 | 5/1961 | Germany. |
| 598,678 | 1/1961 | Belgium. |

LEON J. BERCOVITZ, *Primary Examiner.*

DONALD E. CZAJA, *Examiner.*